May 9, 1933.    R. RUEMELIN    1,908,560
BANKER DUST COLLECTOR UNIT
Filed Jan. 26, 1931    2 Sheets-Sheet 1
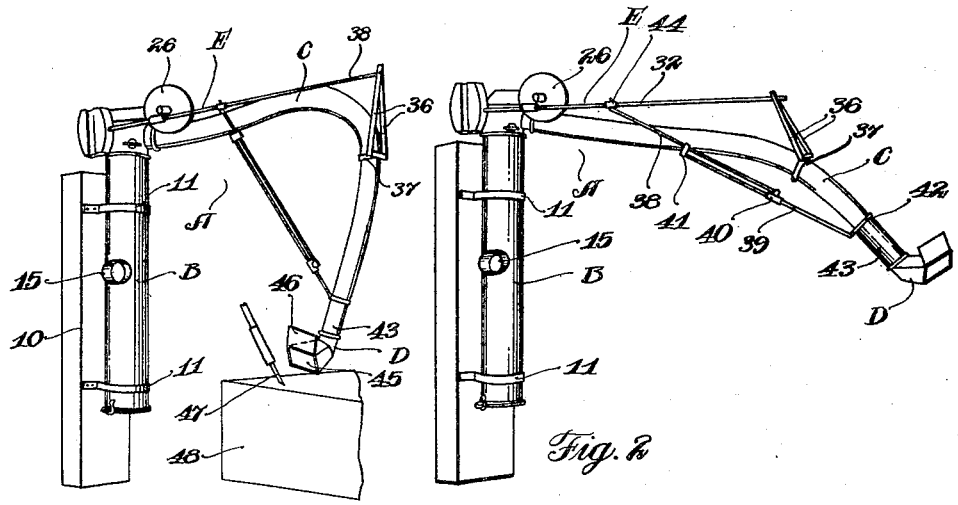
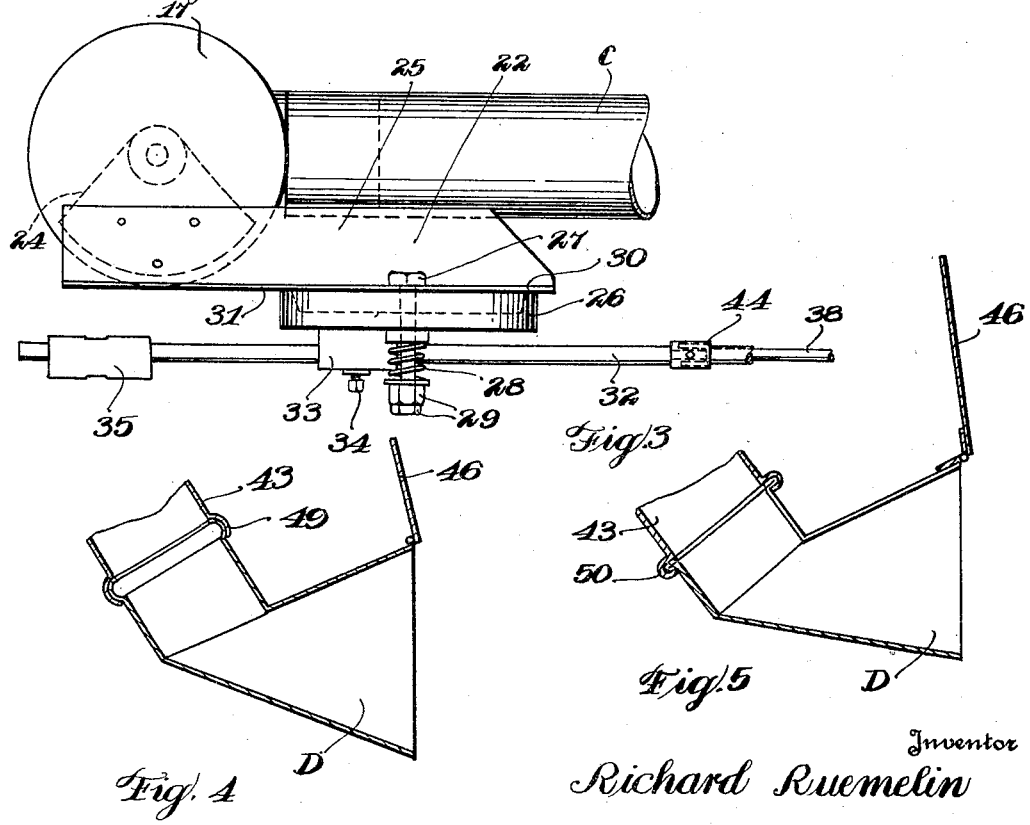
Inventor
Richard Ruemelin
By Howard Riches
Attorney

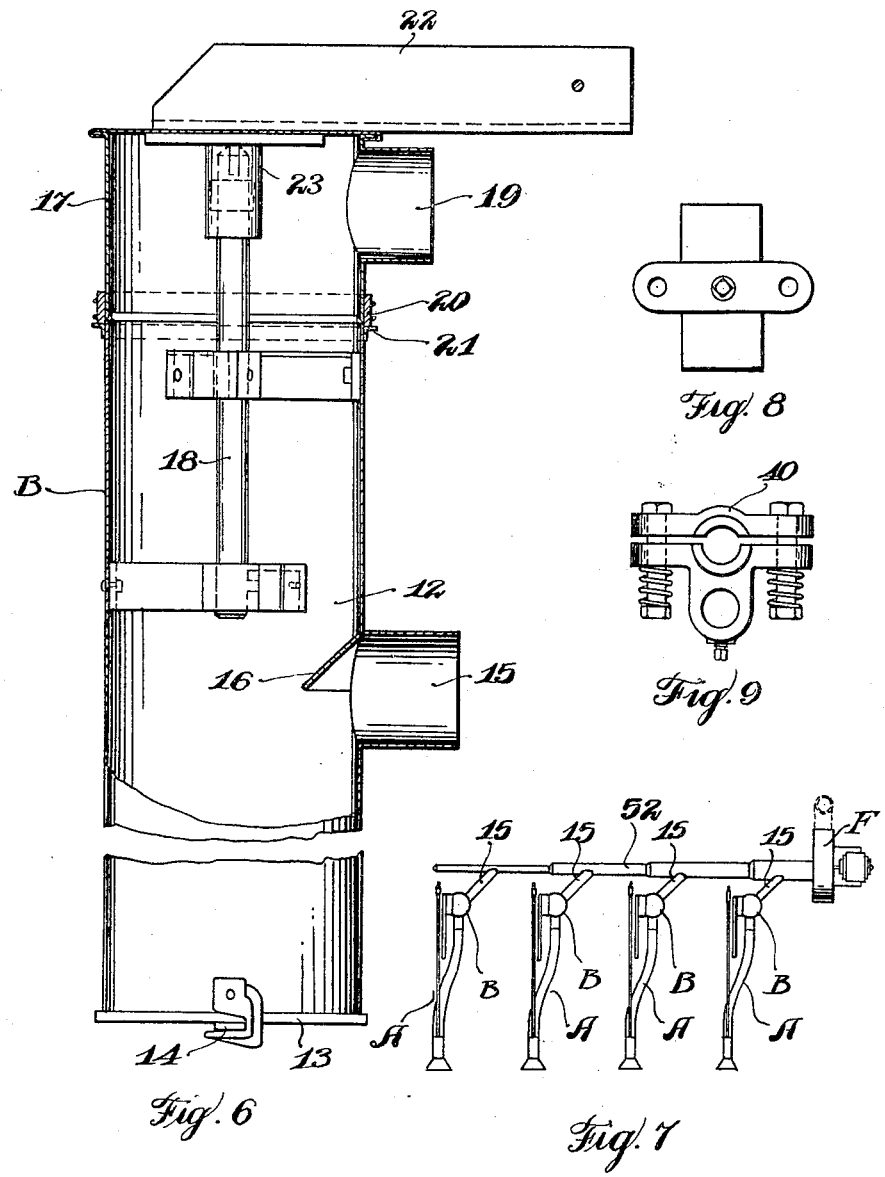

Patented May 9, 1933

1,908,560

REISSUED

UNITED STATES PATENT OFFICE

RICHARD RUEMELIN, OF MILWAUKEE, WISCONSIN

BANKER DUST COLLECTOR UNIT

Application filed January 26, 1931. Serial No. 511,300.

This invention relates to a banker dust collector unit adapted to operate to collect the dust in granite, stone and marble works or fumes or smoke gases in varied industries, so as to protect the health of the stone workers and permit the workers to operate the stone cutting tool with a clear vision of the work against which the tool is operating.

A feature of the collector unit is to provide a dust collecting snout which may be suspended from the unit in an adjustable manner with means for holding the snout in a set or predetermined position so that the worker may adjust the same close to the working tool and may also move the collecting snout from time to time. The dust and particle collector is provided with a flexible tube which extends from the sand trap and is counterbalanced so that the same may be readily supported in conjunction with the sand trap in an operative manner. The adjustment of the dust collecting snout is of a nature to provide extreme flexibility and quick adjustment in any direction. The counterbalancing provides a means of holding the snout where it is needed. It may be instantly changed by the operator and it will remain in a fixed position wherever it is set.

The unitary structure is important as it provides a banker dust collector which may be set up in a convenient place and the body of the sand trap which is in the form of a cylindrical casing and to which the dust pipe is connected, may be attached in a convenient manner to support the sand trap elevated in a manner to properly support and carry the flexible tube which carries a revolvable snout on the free end thereof. The snout is provided with a damper to adjust the opening and also which acts as a guard so that particles flying off from the working tool or nozzle of the operator working on the stone will cause the particles striking against the damper to fall or be carried toward the opening of the snout. This damper may be set at the desired angle to act as a shield or deflector as associated with the opening of the snout.

A revolving head is provided upon the body of the sand trap which carries the flexible rubber hose which supports the dust and particle collecting snout and this permits the flexible hose or tube to rotate as a unit around the top of the sand trap or casing. This adds a material advantage to the banker dust collector. This revolving head also carries the friction wheel for engaging and supporting the brace members for holding the flexible snout supporting tube, and to carry the counterweight members in proper operating position. A suitable sand discharge door is provided in the bottom of the sand trap or casing so that this may be cleaned out whenever it is desired.

The various features and details, together with other advantages will be more clearly and fully hereinafter set forth.

In the drawings forming part of this specification:

Figure 1 is a perspective of my banker dust collector as it would appear in operation.

Figure 2 illustrates another position of the banker dust collector.

Figure 3 is an enlarged plan of a detail portion of the same.

Figure 4 is an enlarged sectional detail of the dust collecting snout.

Figure 5 illustrates another sectional detail of the dust collecting snout, showing a different form of support for the same.

Figure 6 is an enlarged detail, partly in section of the sand trap housing illustrating the supporting means for the revolvable head.

Figure 7 illustrates a series of banker dust collector units as they may be operated in series and showing their relative position as connected with a dust collecting fan.

Figure 8 is a plan view of one of the friction connectors for the supporting arms which hold the flexible snout supporting tube.

Figure 9 is an end view of the friction connection illustrated in Figure 8.

The banker dust collector A is formed in a unitary structure which composes mainly the sand trap B, the flexible hose C, the snout D and the adjustable supporting means E for holding the flexible hose C in operative position. The banker dust collector unit A may be supported upon the wall or to the member such as 10, by means of the connectors 11 which are directly connected to the sand trap housing B. The sand trap B is of a tubular or cylindrical nature and may be formed of metal or other suitable material to provide the sand trap chamber 12 within the same. The bottom of the chamber 12 is closed by a door 13 held in closed position by the catch 14 and this permits the contents of the sand trap B to be emptied when it is desired. This sand trap B is provided with a dust pipe connection 15 which is to be connected with a dust collecting fan, such as F, illustrated in Figure 7. The dust pipe connection 15 may be connected in any suitable manner to a fan so as to provide a suitable suction in the chamber 12 to draw the dust and particles of stone into the sand trap B.

The inner end of the dust pipe connection 15 is provided with a guard 16 over the top of the same so as to prevent any chips or particles of stone as well as the dust drawn into the sand trap B from passing out of the connection pipe 15. This guard 16 causes the sand or dust with the chips of stone to fall down into the lower part of the chamber 12 in the sand trap.

The sand trap B is provided with a revolving head 17 which is supported upon the axially positioned shaft 18 extending in the upper end of the chamber 12. The head 17 is freely rotatable upon this shaft in a manner so that it may turn around in any direction. Projecting from one side of the head 17 an intake pipe connection 19 is provided which is adapted to receive one end of the flexible hose or connector C. A dust tight joint is provided around the lower edge of the revolving head 17 by the packing member 20 which extends around and bears against the shoulder formed by the angle iron flange 21. This forms a tight joint and permits the head 17 to rotate freely and yet maintains a dust tight joint.

Extending over one side of the top of the head 17 I provide an angle member 22 which projects from one side of the head and is secured thereto so as to form a supporting means for carrying the members which adjustably support the flexible tube or hose C. A bearing casting 23 is positioned within the head 17 which fits over the upper end of the shaft 18 to form bearing support for the head 17 on the upper end of the shaft 18. This casting is formed with a segment flange 24 which extends on the inside of the head 17 and the flange 25 of the angle member 22 is bolted to this portion 24 to form a firm and rigid support for the angle member 22. On one side of the angle member 22 a disc member 26 is supported by the bolt 27. The bolt 27 extends through the disc 26 and a coil spring 28 is held by the shoulder and nut portion 29 on the outer end of the bolt 27 so as to provide an adjustable spring means bearing against the disc 26 to cause the annular flange 30 of the disc to bear against the surface 31 of the angle member 22. This forms a friction disc the purpose of which will be more fully hereinafter set forth.

A counterbalance rod 32 extends through the boss 33 which is formed on the disc 26 and this rod 32 is adjustably held in the boss 33 by means of the set screw 34. By tightening the set screw 34 the rod 32 may be set in the boss 33 to a desired position. On one end of the rod 32 a counterbalancing weight 35 is positioned while the other end extends forward and is connected to the arms 36. These arms 36 form a supporting brace for the flexible hose C and they are connected to the band 37 which extends around the hose C. This band 37 may also be adjusted as to the position on the flexible hose C. Arms 38 and 39 are slidably connected together by means of the friction joint 40 and the loop end 41 at one end of the arms. The arms 38 and 39 are adapted to provide additional supporting means for the outer or free end of the hose C. The outer end of the arm 39 is connected by a band 42 to the sleeve 43 which supports the snout D. The outer end of the flexible hose C is connected to this sleeve 43 adjacent the band 42. The inner end of the rod 38 is adjustably connected by the clamp 44 to the rod 32. This connection permits the inner end of the rod 38 to be set in the desired position along the rod 32 so as to properly connect the inner end of the brace formed by the rods 38 and 39 in relation to the balancing rod 32. The members 38 and 39 act to form a brace to connect the outer free end of the snout hose C to the balancing rod 32.

The snout D is formed with a flared rectangular opening 45 which is formed with a hinged cover 46 adjustable so as to close the rectangular opening 45 of the snout D, if it is desired. This cover 46 may also be turned up to act as a guard as illustrated in Figure 1 and also in Figure 2, so that when the workman is operating with the sand blast nozzle 47 on a rock such as 48, any chips or particles which may fly off from the rock or the sand coming therefrom may strike up against the cover 46 while it is acting as a guard and this cover being positioned on the top side of the snout permits the particles to fall toward the rectangular opening 45 and be drawn therein by suction in the unit A. The snout 45 may be rotated on the joint 49 or 50 as illustrated in Figures 4 and 5, respectively, to permit the snout opening to be adjusted in the desired position. This forms a quick adjusting means for the snout D.

In operation of the unit A the same is connected in a convenient place and then the workman may operate out in front of the unit A with the stone in a suitable position. When the workman starts on the stone 48 the snout D is adjusted to a position adjacent the cutting tool and the cover 46 which may act as a damper properly adjusted, as illustrated in Figure 1. The workman may readily engage the sleeve 43 and pull the snout into the desired position or turn it around and adjust it from time to time just where it is the most convenient so as to collect and gather up all of the dust and cutting dirt made in operating on the stone 48.

The revolvable head 17 is firmly braced by the shaft 18 and is adapted to freely carry the flexible tube C connected to the pipe 19 with the collecting snout D as well as the counterbalanced supporting means E around in any direction in relation to the sand trap B. This gives free movement for the operator. The disc 26 provides a suitable friction means for holding the mechanism E in a set position and compensates for wear in the operation of the parts.

The suction connecting tube 15 is, of course, connected to a suitable suction mechanism like the pipe 52 which is connected with the suction fan F so as to provide the necessary vacuum in the chamber 12 of the sand trap B. Any suitable suction may be connected up to the pipe 15 so as to operate to provide a suction at the snout D to carry away the dust and dirt so as to protect the workman and to provide a banker dust collector having the advantages of easy operation and quick adjustment. The counterbalancing supporting means E operates to hold the snout D in virtually any position in which it may be set by the workman. The parts are connected together in a manner to permit the unit A to be set up quickly and easily adjusted by any workman. It will be apparent that the dust collecting snout D may be brought close to the sand trap or extended away from the same in accordance with the length of the flexible hose C and the counterbalance supporting means E, thereby providing a very flexible banker dust collector. The simplicity of the structure is important in forming a suitable dust collecting means for individual workmen. The battery of these dust collectors, such as illustrated in Figure 7, may be connected together and operated to protect the workmen individually. In the use of the banker dust collector A the end is kept free of injurious particles of dust and dirt which ordinarily impair the health of the operator and also promote sanitary working conditions, increasing the efficiency of the workmen and assisting in reducing casualty rates as well as giving a better vision to the stone cutter.

In accordance with the patent statutes the banker dust collector has been set forth in its best embodiment thereof, nevertheless, I desire to have it understood that the drawings are only illustrative of a means in which the same may be made and carried out and that variations may be made within the scope of the appending claims which form the essence of the invention.

I claim:

1. A banker dust collector including, a sand trap, a revolvable head formed on said sand trap, a flexible dust collecting hose extending from said head, a dust collecting snout carried by the free end of said hose, and a counterbalanced adjustable supporting means for holding said snout in a predetermined position.

2. A dust collector unit including, a sand trap, a dumping door in said sand trap, a vacuum intake, a guard for said intake, a revolvable head carried by said sand trap, and an adjustable frictionally retarded flexible dust collecting hose carried by said head.

3. A suction device including, a flexible hose member, a snout at its outer end, a horizontal swiveling joint at its inner end, a hinged counterbalance lever arm for supporting said hose member, means for adjusting the reach of said hose and means for holding the hose in this adjusted position.

4. An adjustable dust collecting snout for dust collector units having, an elongated flared opening, a damper shutoff hingedly supported at said opening, and a swivel connection in said snout to permit the same to be revolved in any direction.

5. A dust collector snout for dust collecting units including, a tubular sleeve, a snout member having flared sides to provide a rectangular dust receiving opening, a swivel connection between said sleeve and said flared sides, and a shut-off guard damper hinged along one side of said rectangular opening.

6. A dust collector unit including, a sand dust trap, a sand discharge door, a dust pipe connection to a suction fan, a revolving head, a flexible hose carried by said head, a dust collecting nozzle on the free end of said hose, and a counterbalanced bracket member means having a frictional connection carried by said head to hold said snout counterbalanced in any adjusted position.

7. A banker dust collector including, a cylindrical sand trap, a connection for a suction fan, a guard over the inner part of said connection in said sand trap, a rotatable head supported on said sand trap, a flexible hose carried by said head, a ratchet angle member suported by and projecting from said head, a friction wheel carried by said angle member, a counterbalanced rod carried by said friction wheel, a dust collecting snout supported on the free end of said hose, and brace arms connected adjacent said snout and between said snout and said head to adjustably support said flexible hose to permit the operator to set said snout in a predetermined counterbalanced position.

8. A banker dust collector having a unitary nature including, a sand trap, a rotatable head, a flexible hose carried by said head means rotatable with said head for supporting said hose, and an adjustable dust collecting snout rotatably secured on the free end of said hose.

9. A dust collector unit including, a sand trap having a long cylindrical nature, a revolvable head carried on said sand trap adapted to rotate around said sand trap, a flexible hose extending from said head, a dust collecting snout on the free end of said hose, and a counterbalanced adjustable bracket supporting means including a frictional retarder carried by said head and having means extending to support the free flexible portions of said hose to hold said snout in set operative position.

10. A dust collector unit including, a flexible hose, a dust collecting snout on the free end of said hose having a rotatable joint to permit the opening of the snout to be adjusted in any direction, a damper guard for the opening of said snout, a sand trap, a head formed on said sand trap adapted to receive said flexible hose, a suction connection to said sand trap, and counterbalancing means to hold said hose with said snout counterbalanced in a workable position.

11. A dust collector comprising, a flexible hose and tubular suction member, a swiveling dust suction snout connected to the outer free end of said hose, a swiveling head member connected to the inner end of said hose and means for supporting said hose adjustably upwardly and downwardly to give vertical and up and down adjustment freely to said suction snout.

12. A dust collector comprising, a flexible tubular suction member, a swivelly connected suction snout secured to the outer end thereof, and a head connected to the inner end thereof having a swivel supporting means, and means for adjustably supporting said flexible hose to said swiveling head.

RICHARD RUEMELIN.